Patented Mar. 3, 1925.

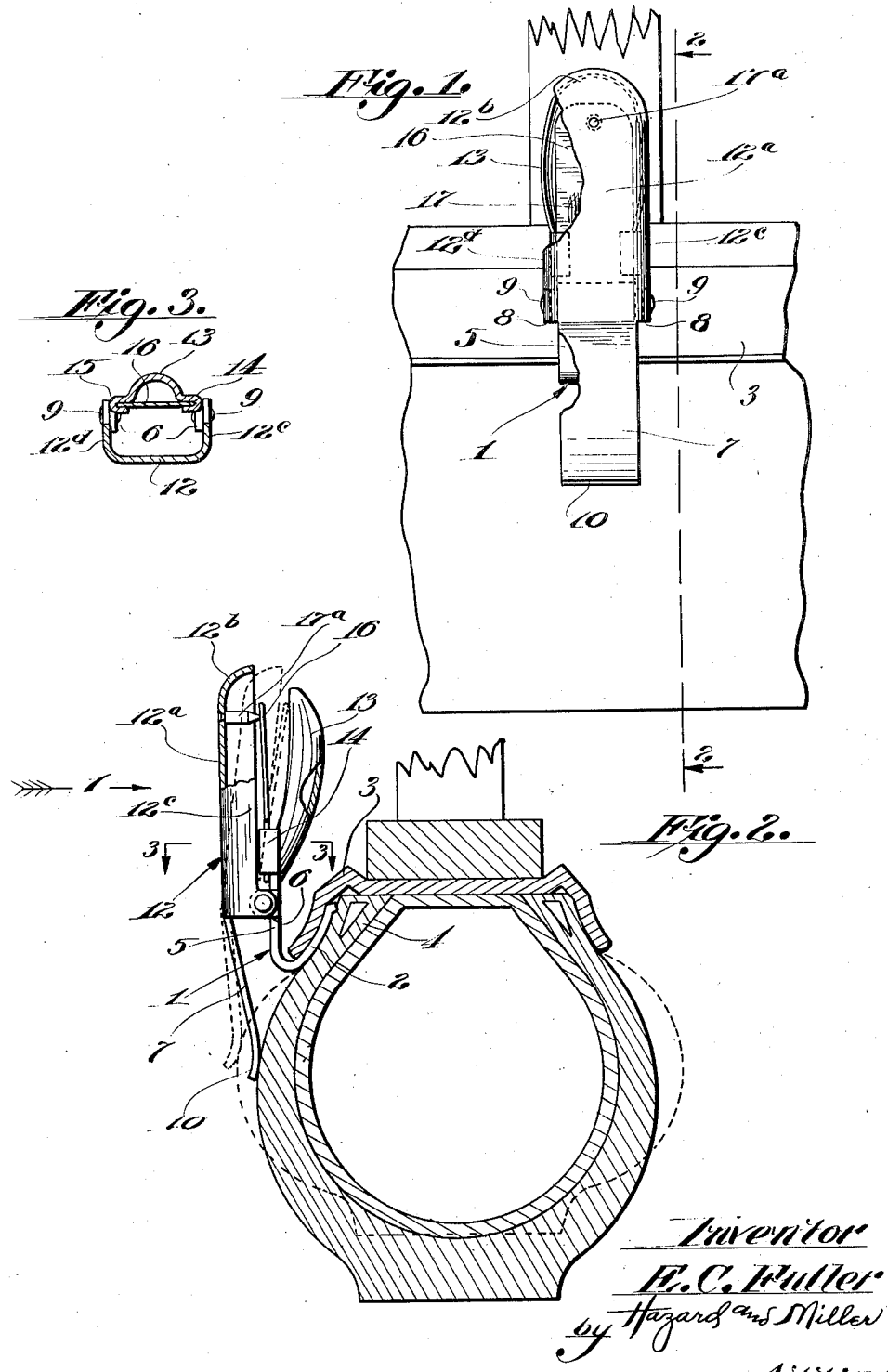

1,528,202

UNITED STATES PATENT OFFICE.

EARNEST C. FULLER, OF FILLMORE, CALIFORNIA.

SOFT-TIRE ALARM.

Application filed April 2, 1924. Serial No. 703,633.

*To all whom it may concern:*

Be it known that I, EARNEST C. FULLER, a citizen of the United States, residing at Fillmore, in the county of Ventura and State of California, have invented new and useful Improvements in Soft-Tire Alarms, of which the following is a specification.

My invention relates to soft tire alarms and consists of the novel features herein shown, described and claimed.

The objects and advantages will appear from the drawings and specification.

The drawings illustrate the soft tire alarm applied to a pneumatic tire and wheel rim ready for use.

Figure 1 is a fragmentary elevation of a pneumatic tire and wheel rim with a soft tire alarm applied thereto ready for use in accordance with the principles of my invention, parts being broken away to show the construction, the view being taken looking in the direction of the arrow 1 in Fig. 2.

Fig. 2 is a cross section of the tire and rim and showing an edge view of the soft tire alarm as indicated by the line 2—2 in Fig. 1, parts being broken away and shown in section.

Fig. 3 is a horizontal sectional detail on the line 3—3 in Fig. 2, and looking downwardly as indicated by the arrows.

The details of the soft tire alarm shown in the drawings are as follows:

The supporting base 1 is stamped and formed from sheet metal and comprises a hook portion 2 adapted to be inserted between the tire rim 3 and the bead 4 of the pneumatic tire so as to be firmly held by the expansion of the pneumatic tire. The arm 5 extends from the outer end of the hook 2 so as to occupy a radial position relative to the wheel when the alarm has been applied. A pair of ears 6 extend from the sides of the arm 5 substantially at the center of the length. A lever 7 has a mating pair of ears 8 secured to the ears 6 by rivets 9. The ears 8 are intermediate of the ends of the lever 7 and the lower end 10 of the lever 7 is bowed to form a contact bearing upon the side of the pneumatic tire 11. The sounding board 12 is a part of the lever 7. The second sounding board 13 is formed integral with the arm 5 and is oval in outline and dished to present a concave face outwardly. Return bends 14 and 15 are formed along the sides of the lower part of the sounding board and are adapted to receive the clicker 16 which is a piece of straight spring band properly dished and dented at 17 and the lower end of the band is driven tightly into the return bends 14 and 15, so as to hold the parts securely together.

The sounding board 12 has a straight central portion $12^a$ in line with the contact 10 and the upper end $12^b$ of the central portion $12^a$ is curved inwardly. The sides $12^c$ and $12^d$ extend from the central portion $12^a$ inwardly at right angles with rounded corners and the ears 8 are at the lower corners of these sides $12^c$ and $12^d$. The pin $17^a$ is fixed against the inner face and upper part of the central portion $12^a$ and engages the clicker 16 near its upper end so that when the pneumatic tires 11 become soft and expand laterally the contact end 10 will be moved outwardly as shown in dotted lines and the pin $17^a$ will be moved inwardly as shown in dotted lines every time the wheel goes around to bring the tire tread 18 in the plane of the alarm into contact with the ground and the reaction will throw the sounding board 12 outwardly by the tension of the clicker 16 and the clicker will produce a clicking sound to warn the operator that the tire is becoming soft. The sound of the clicker 16 will be confined to some extent between the sounding boards 13 and 12 and will be discharged laterally between the edges of the sounding boards.

The part 16 may be any suitable sound producer that may be operated by the vibration of the lever 7, the only requirement being that the part shall have sufficient spring tension to throw the upper end of the lever 7 outwardly and keep the lower end of the lever bearing against the side of the tire and that the vibration of the part produced by a flat tire will produce a sound to attract the attention of the operator.

Various changes may be made without departing from the spirit of my invention as claimed.

I claim:

1. A soft tire alarm comprising a hook adapted to be inserted between a tire rim and a pneumatic tire, an arm extending from the hook, a lever pivotally connected to the arm and having one end bearing upon the side of the tire, a pin fixed in the upper end of the lever, a sound producer carried by the arm and adapted to be operated by the vibration of the lever pressing the pin against the sound producer when the tire is soft.

2. A soft tire alarm comprising a base having a member adapted to be inserted between a tire rim and tire bead and held in place by the expansion of the tire, an arm extending from the member, a lever pivotally connected to the arm and having one end adapted to bear upon the side of the tire, a spring steel clicker rigidly connected to the arm and pressing outwardly upon the opposite end of the lever from the tire so that when the tire becomes soft the clicker will be operated to give the alarm.

3. A soft tire alarm comprising a supporting base including a hook portion adapted to be inserted between a tire rim and a tire bead and an arm extending from the outer end of the hook portion so as to occupy a radial position relative to a wheel, a pair of ears extending from the sides of the arm and at the center of its length, a lever having a mating pair of ears pivotally connected to the first ears, the lower end of the lever being bowed and adapted to bear upon the side of a pneumatic tire and the upper end of the lever being adapted to serve as a sounding board, a second sounding board extending upwardly from the arm, return bends formed along the sides of the lower part of the second sounding board, a clicker driven tightly into the return bends and extending upwardly and springing outwardly, and a pin extending inwardly from the upper end of the lever to bear against the upper end of the clicker.

In testimony whereof I have signed my name to this specification.

EARNEST C. FULLER.